United States Patent [19]

Simington

[11] 4,044,635
[45] Aug. 30, 1977

[54] SAW CHAIN SHARPENER

[76] Inventor: Jack F. Simington, Box 141, Star Rte., Chiloquin, Oreg. 97624

[21] Appl. No.: 697,745

[22] Filed: June 18, 1976

Related U.S. Application Data

[63] Continuation-in-part of Ser. No. 516,129, Oct. 18, 1974.

[51] Int. Cl.² .......................................... B23B 63/16
[52] U.S. Cl. ..................................... 76/42; 76/25 A; 76/74
[58] Field of Search .................... 76/25 A, 42, 40, 74, 76/78; 51/98, 96, 98.5

[56] References Cited

U.S. PATENT DOCUMENTS

| 2,833,166 | 5/1958 | Wilson | 76/78 R X |
| 3,006,222 | 10/1961 | McEwan | 76/25 A |
| 3,013,448 | 12/1961 | Deck | 76/40 |
| 3,071,026 | 1/1963 | Dewitt | 76/25 A |
| 3,349,645 | 10/1967 | Silvey | 76/40 |
| 3,592,085 | 7/1971 | Arneson | 76/25 A |
| 3,880,018 | 4/1975 | Simington | 76/25 A |

FOREIGN PATENT DOCUMENTS

| 2,224,993 | 10/1974 | France | 76/25 A |

Primary Examiner—James L. Jones, Jr.
Assistant Examiner—Nicholas P. Godici
Attorney, Agent, or Firm—Clarence A. O'Brien; Harvey B. Jacobson

[57] ABSTRACT

A first mounting structure is provided and supported atop a support standard. The mounting structure has a motor driven rotary grinding wheel journaled therefrom and a second structure defining a support arm has one end thereof oscillatably supported from the mounting structure for swinging movement of the other end of the support arm about an axis generally paralleling but spaced from the axis of rotation of the grinding wheel. The other end of the support arm includes a mount for supporting a chain saw chain therefrom with a selected tooth of the chain in predetermined indexed position and the support arm is swingable into and out of positions with the selected indexed tooth properly engaged with the periphery of the grinding wheel for sharpening the tooth. The structure for oscillatably supporting the support arm from the mounting structure comprises an adjustable length pivot fastener of the shank type secured through aligned bores formed in overlapped portions of the mounting structure and the support arm and with thrust bearing washers disposed on the shank type pivot fastener between the overlapped portions. Further, the mount for supporting the saw chain from the free end of the support arm includes a cylindrical disc provided with a radially outwardly opening and circumferential groove with diametrically opposite portions of the groove being of different width and the disc being supported from the support arm for shifting between 180 degree angularly displaced positions whereby different width portions of the groove in the periphery of the disc may be used to accommodate saw chains having guide lugs of different thicknesses.

7 Claims, 5 Drawing Figures

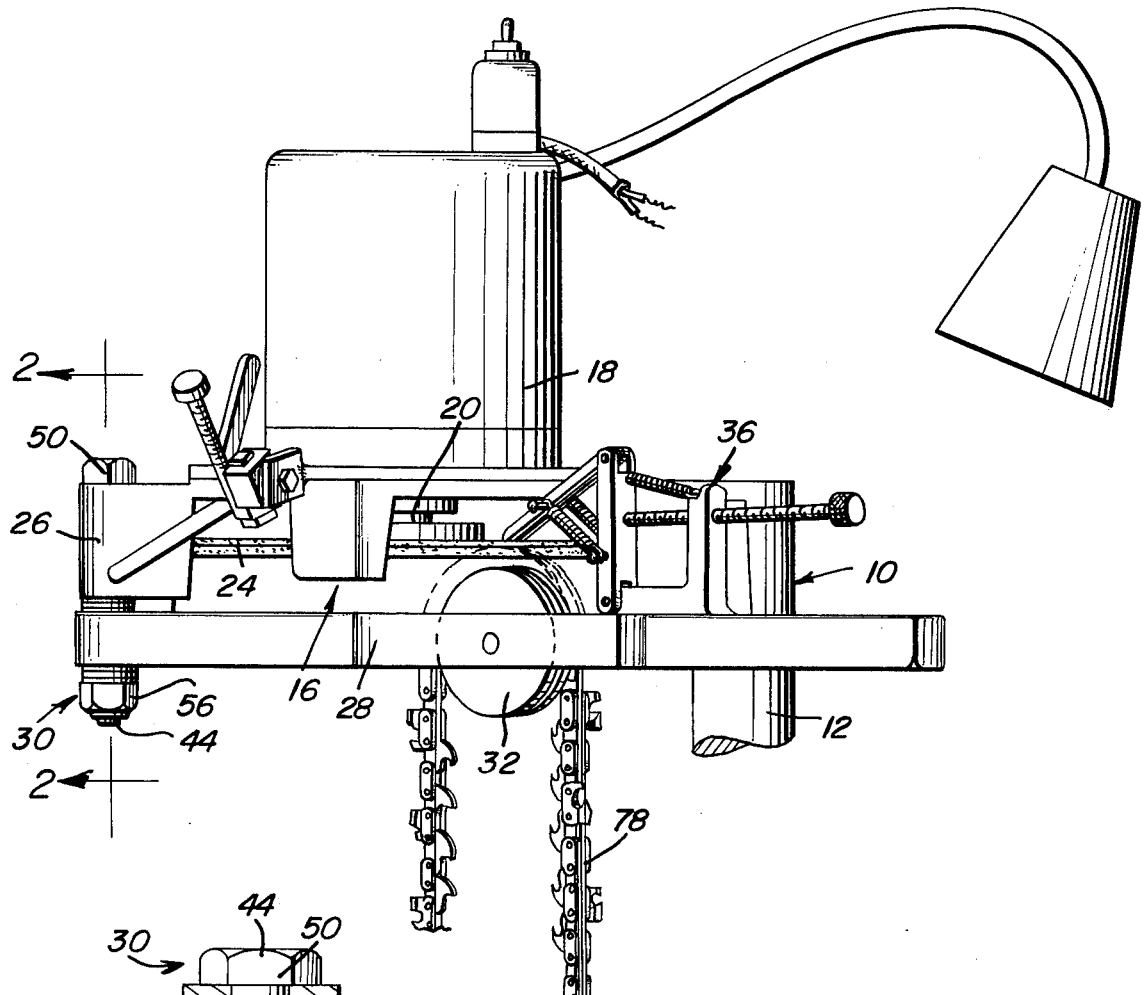
Fig. 1
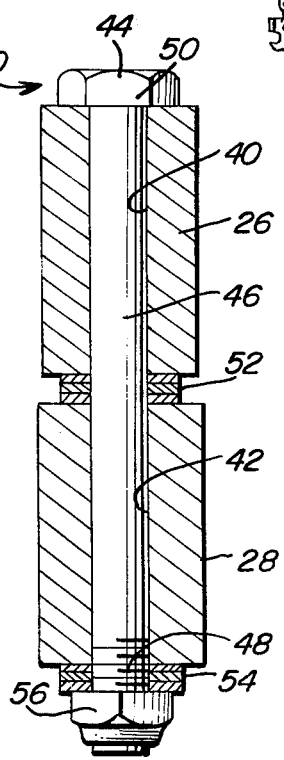
Fig. 2
Fig. 4

SAW CHAIN SHARPENER

BACKGROUND OF THE INVENTION

This application comprises a continuation-in-part of my copending U.S. application Ser. No. 516,129, filed Oct. 18, 1974.

The instant invention comprises an improvement over the chain saw sharpener disclosed in my above-noted prior application by the inclusion of improved pivot structure for oscillatably supporting the support arm portion of the sharpener from the mounting structure thereof and also by providing a saw chain supporting disc provided with a circumferential radially outwardly opening groove whereby a chain to have the teeth thereof sharpened may be draped over the disc with the guide lugs of the chain guidingly engaged in the groove of the disc, diametrically portions of the groove being of different widths whereby saw chains having guide lugsof different thicknesses may be supported from the same support disc.

SUMMARY OF THE INVENTION

The chain saw sharpener has been constructed in a manner to provide a more precise and yet inexpensive manner of oscillatably supporting the support arm portion thereof from the mounting structure therefor so as to provide more precisely controlled movement of a saw chain tooth to be sharpened into and out of engagement with the rotary grinding wheel of the sharpener. In addition, the mounting structure by which the saw chain to be sharpened may be supported from the support arm structure is shiftable in position so as to be adapted to more efficiently stationarily support saw chains of different types during the sharpening process.

The main object of this invention is to provide an improved saw chain sharpener which will be operable to stationarily support saw chains having different thickness guide lugs in proper position with successive teeth of the chain in proper indexed position for sharpening by a rotary grinding wheel.

Another object of this invention is to provide inexpensive pivot structure to enable the support structure for a saw chain to be sharpened to be precisely shifted along a predetermined path relative to a rotary grinding wheel in order to bring successive teeth of the chain into and out of engagement with the grinding wheel.

A final object of this invention to be specifically enumerated herein is to provide a saw chain sharpened in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary elevational view of the upper portion of a saw chain sharpener constructed in accordance with the present invention;

FIG. 2 is an enlarged vertical sectional view taken substantially upon the plane indicated by the section line 2—2 of FIG. 1;

FIG. 4 is a vertical sectional view taken substantially upon the plane indicated by the section line 4—4 of FIG. 3.

DETAILED DESCRIPTION OF THE INVENTION

Figure 3:
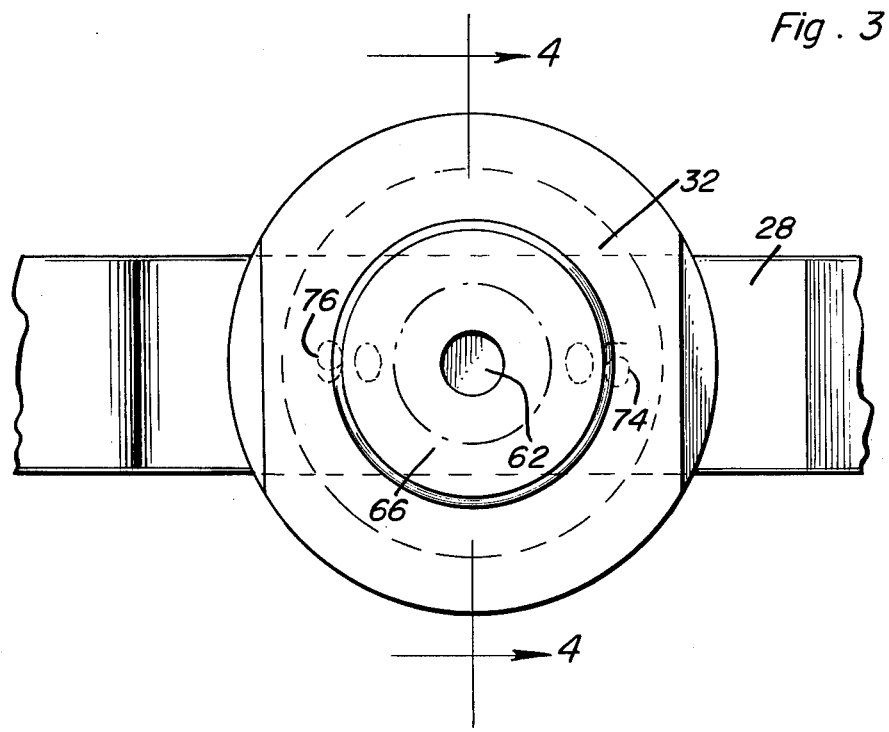
FIG. 3 is a fragmentary enlarged side elevational view of the chain support disc mounted on the support arm structure of the sharpener and by which saw chains having guide lugs of different thicknesses may be properly supported in indexed position for sharpening by contact with the grinding wheel of the sharpener.
Figure 5:
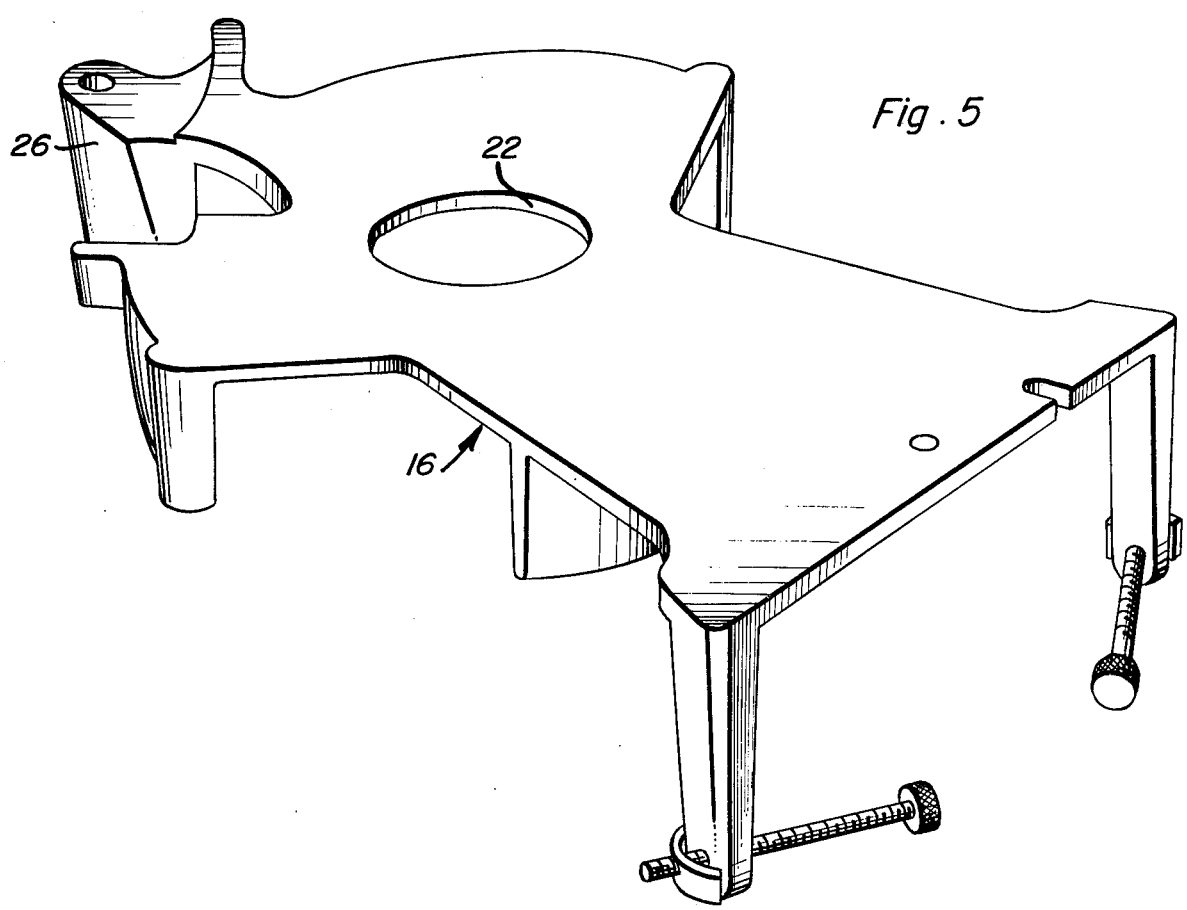
FIG. 5 is a perspective view of the mounting structure of the sharpener from which the motor drive rotary grinding wheel is journaled and the support arm structure is oscillatably supported.

Referring now more specifically to the drawings, the numeral 10 generally designates the saw chain sharpener of the instant invention. The sharpener 10 includes an upright standard 12 from whose upper end a mounting structure referred to in general by the reference numeral 16 is stationarily supported. The mounting structure 16 supports a motor 18 therefrom including an output shaft 20 which projects downwardly through a central opening 22 formed in the mounting structure 16 and has a rotary grinding wheel 24 mounted on its lower end below those portions of the mounting structure 16 defining the opening 22.

The mounting structure 16 includes a mounting boss portion 26 from which one end of a support arm 28 is oscillatably supported by means of a pivot fastener referred to in general by the reference numeral 30 secured through the mounting boss portion 26 and the underlying end of the support arm 28. Further, the free end portion of the support arm 28 supports a cylindrical disc 32 provided with a circumferentially extending and radially outwardly opening groove 34. Also, the free terminal end portion of the support arm 28 includes saw chain indexing structure referred to in general by the reference numeral 36 and which is operable to engage and properly index successive teeth of a saw chain draped over the disc 32 with its guide lugs received in the groove 34 for sharpening upon swinging movement of the support arm 28 to shift the tooth to be sharpened into contact with the periphery of the grinding wheel 24.

The foregoing comprises a general description of the saw chain sharpener disclosed in my copending U.S. application Ser. No. 516,129, filed Oct. 18, 1974.

The saw chain sharpener 10 of the instant invention includes improved structure whereby the mounting boss portion 26 is provided with a vertical through bore 40 which is aligned with a through bore 42 formed through the base end of the support arm 28. The pivot fastener 30 comprises a headed bolt 44 including a shank portion 46 snugly and rotatably received through the bores 40 and 42 and which is threaded as at 48 on its end remote from the head 50 of the bolt 44. Three thrust bearing defining washers 52 are disposed on the shank portion 46 intermediate the mounting boss portion and the support arm 28 and a second set of three thrust bearing defining washers 54 are disposed on the shank portion 46 which projects through and beyond the end of the bore 42 remote from the bore 40. Finally, the pivot fastener 30 includes a threaded nut 56 threadedly engaged on the terminal end of the shank portion 46 remote from the head 50 and the nut 56 is tightened so as to place the shank portion 46 under at least some tension. The washers 52 and 54, however, comprise thrust bearing means and the bore 42 forms a journal bearing whereby the support arm 28 is freely oscillatable relative to the shank portion 46 and the mounting boss portion 26. Thus, the free end portion of the support arm 28 from which the disc 32 is supported is guided in a precise path toward and away from the grinding wheel 24 when the support arm 28 is oscillated relative to the mounting structure 16.

With attention now invited more specifically to FIGS. 3 and 4 of the drawings, it may be seen that the outer end portion of the support arm 28 includes a horizontal transverse bore 60 formed therethrough in which one end of a shank member 62 is stationarily secured. The other end of the shank member 62 projects outwardly of one side of the support arm 28 and is externally threaded as at 62.

The disc 32 has a central bore 64 formed therethrough which loosely receives the threaded outwardly projecting end of the shank member 62 and a threaded handwheel 66 is threaded on the outer terminal end of the shank member 62 outwardly of the disc 32 whereby the handwheel 66 may be turned to tightly clamp the disc 32 in adjusted rotated position on the shank member 62 between the handwheel 66 and the opposing side of the support arm 28.

The groove 34 includes two sections 68 and 70 thereof which are of substantially 180° in angular extent and it will be noted that the section 70 is wider than the section 68. The section 68 is five one-hundredths of an inch in width and the section 70 is six one-hundredths of an inch in width, the outer side of the disc 32 being provided with relatively inverted indicia 74 and 76 to indicate the width of the groove section disposed uppermost when the disc 32 is secured in relative 180° displaced positions.

From FIG. 1 of the drawings it may be seen that a saw chain 78 to saw chain 78 to be sharpened may be draped over the disc 32 with the guide lugs of the chain 78 received in that groove section disposed uppermost and the side links of the chain portion extending over the disc 32 supported from the outer peripheral portions of the disc 32 disposed on opposite sides of the groove 34. If the chain 78 is provided with thick guide lugs the section 70 of the groove 34 is disposed uppermost. However, if the chain 78 is equipped with the thinner guide lugs the handwheel 66 is loosened and the disc 32 is rotated 180° to the position thereof illustrated in FIGS. 3 and 4 of the drawings after which the handwheel 66 is tightened to clamp the disc 32 in position and the saw chain equipped with thinner guide lugs may be draped over the disc 32 with the thinner guide lugs received in the narrow section 68 of the groove 34. Of course, the general over-all operation of the saw chain sharpener 10 is substantially identical to the operation of the chain saw sharpener disclosed in my above-noted copending application.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a saw chain sharpener including a first portion from which a drivable rotary grinding member is journaled and a second portion provided for predetermined indexing of a saw chain tooth relative thereto with the tooth supported from said second portion for sharpening by the grinding wheel mounting means mounting one of said portions from the other portion for swinging movement relative thereto about an axis of oscillation stationarily positioned relative to said portions, said mounting means including an elongated arm, said second portion being supported from one end of said arm, said mounting means further including pivot means pivotally connecting the other end of said arm and first portion for relative angular displacement about said axis of oscillation to enable a tooth supported from said second portion to be swung into and out of engagement with said grinding wheel, said second portion including a support disc supported therefrom for adjustable angular displacement relative to said second portion about an axis passing centrally through said disc and extending transversely of said arm, the outer periphery of said disc including peripherally continuously extending groove sections formed therein of slightly different predetermined width for snugly slidably receiving chain tooth guide lugs of different thicknesses, said groove sections each extending generally 180° about said disc and being of constant width.

2. The combination of claim 1 wherein said first portion and said other end of said arm are disposed in relative overlapped relation and the overlapped portions thereof include aligned through bores, an adjustable length shank type pivot fastener secured through and rotatably received in said bores and defining said axis of oscillation, and axial thrust bearing means disposed between the opposing overlapped portions.

3. The combination of claim 2 wherein said thrust bearing means comprise a plurality of washers disposed on said shank type fastener between said opposing overlapped portions.

4. In a saw chain sharpener including a first portion from which a drivable rotary grinding member is journaled and a second portion provided for predetermined indexing of a saw chain tooth relative thereto with the tooth supported from said second portion for sharpening by the grinding wheel, mounting means mounting one of said portions from the other portion for swinging movement relative thereto about an axis of oscillation stationarily positioned relative to said portions, said mounting means including an elongated arm, said second portion being supported from one end of said arm, said mounting means further including pivot means pivotally connecting the other end of said arm and first portion for relative angular displacement about said axis of oscillation to enable a tooth supported from said portion to be swung into and out of engagement with said grinding wheel, said second portion including a support disc supported therefrom for adjustable angular displacement relative to said second portion about an axis passing centrally through said disc and extending transversely of said arm, the outer periphery of said disc including peripherally extending groove sections formed therein of slightly different width for snugly receiving chain tooth guide lugs of different thicknesses, said elongated arm including a laterally outwardly projecting threaded stud, said disc being centrally apertured and rotatably mounted on said stud, and a threaded clamp type handwheel threaded on said stud outwardly of said disc for clamping the latter between said handwheel and the opposing side of said arm.

5. In combination, an elongated support arm including first and second end portions, a mount, a drivable rotary grinding wheel journaled from said mount, mounting means conecting said mount and said one end portion of said arm for relative oscillation about an axis of oscillation extending transverse to said arm and for swinging of the other end portion of said arm about said axis into and out of close proximity with at least one peripheral portion of said grinding wheel, saw chain support means carried by said other end portion of said arm for stationarily supporting a saw chain therefrom and including chain tooth indexing means operative to position a selected tooth of said chain in predetermined indexed position relative to said arm, whereby said selected tooth, upon swinging of said arm to a position with said one end portion in close proximity to said peripheral portion of said grinding wheel, will be properly positioned relative to said wheel for sharpening thereby, said chain saw support means including a support disc supported from said arm for ajustable angular displacement relative to said second portion about an axis passing centrally through said disc and extending transversely of said arm, the outer periphery of said disc including peripherally extending groove sections formed therein of slightly different width for snugly receiving chain tooth guide lugs of different thicknesses, said elongated arm including a laterally outwardly projecting threaded stud, said disc being centrally apertured and rotatably mounted on said stud, and a threaded clamp type handwheel threaded on said stud outwardly of said disc for clamping the latter between said handwheel and the opposing side of said arm.

6. The combination of claim 5 wherein said one end portion of said arm and said mount include overlapped portions provided with aligned bores, said mounting means comprising an adjustable length shank type pivot fastener secured through and rotatably received in said bores and defining said axis of oscillation, and axial thrust bearing means disposed between the opposing overlapped portions.

7. In combination, a mount, a drivable rotary grinding wheel journaled from said mount, a support, a disc, mounting means mounting said disc on said support for angular adjustment relative to said support about a first axis passing centrally through said disc, support means mounting said support from said mount for swinging about an axis generally normal to said first axis and generally paralleling the axis of rotation of the rotary grinding wheel, the outer periphery of said disc including peripherally continuously extending groove sections formed therein of slightly different predetermined width for snugly slidably receiving chain tooth guide lugs of different thicknesses, said groove sections each extending generally 180° about said disc and being of constant width.

* * * * *